United States Patent

[11] 3,582,132

[72] Inventor Leslie E. Gunning
 500 12th Ave., N.E., Minot, N. Dak. 58701
[21] Appl. No. 814,619
[22] Filed Apr. 9, 1969
[45] Patented June 1, 1971

[54] CABS FOR VEHICLES
 10 Claims, 9 Drawing Figs.

[52] U.S. Cl. .................................................. 296/28
[51] Int. Cl. ............................................. B62d 33/06
[50] Field of Search .................................... 296/28, 28
 (.21), 35, 102; 180/89

[56] References Cited
 UNITED STATES PATENTS
 2,362,453 11/1944 Cosper ...................... 296/28(.21)X

| | | | |
|---|---|---|---|
| 2,965,414 | 12/1960 | Englehard .................... | 296/35 |
| 3,360,295 | 12/1967 | Reynolds .................... | 296/28(.21) |

FOREIGN PATENTS

| 660,542 | 11/1951 | Great Britain .............. | 296/28(.21) |
| 807,201 | 1/1959 | Great Britain .............. | 180/89 |
| 141,339 | 7/1953 | Sweden ...................... | 296/28(.21) |

Primary Examiner—Kenneth H. Betts
Assistant Examiner—John A. Pekar
Attorney—Johnston, Root, O'Keeffe, Keil, Thompson & Shurtleff ABSTRACT: A cab construction for tractors, and the like, which is pivotable to various operative positions and includes a door at the rear of the driver's compartment.

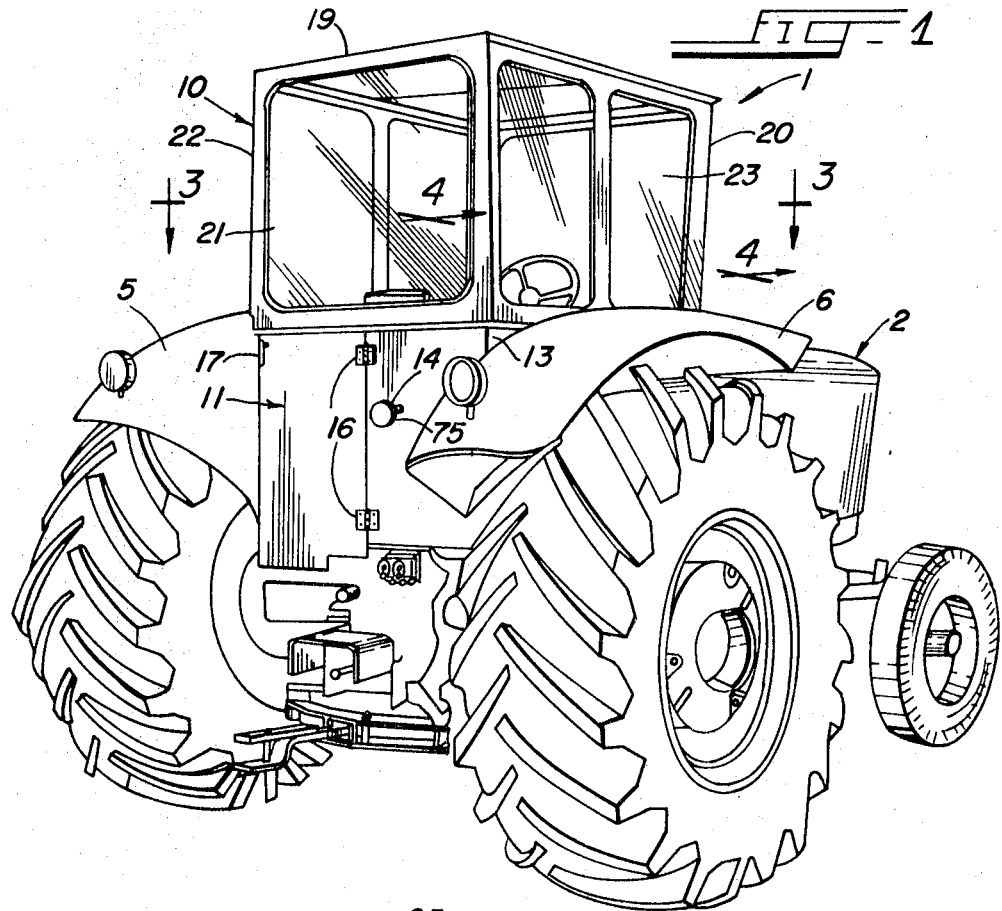
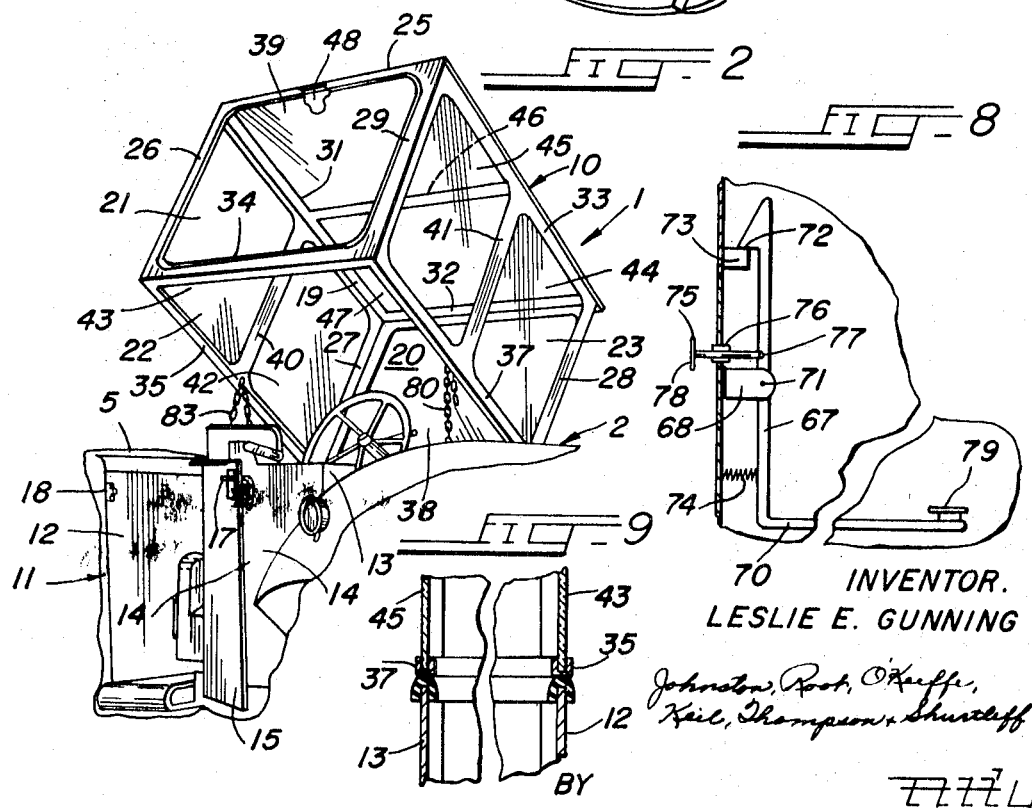

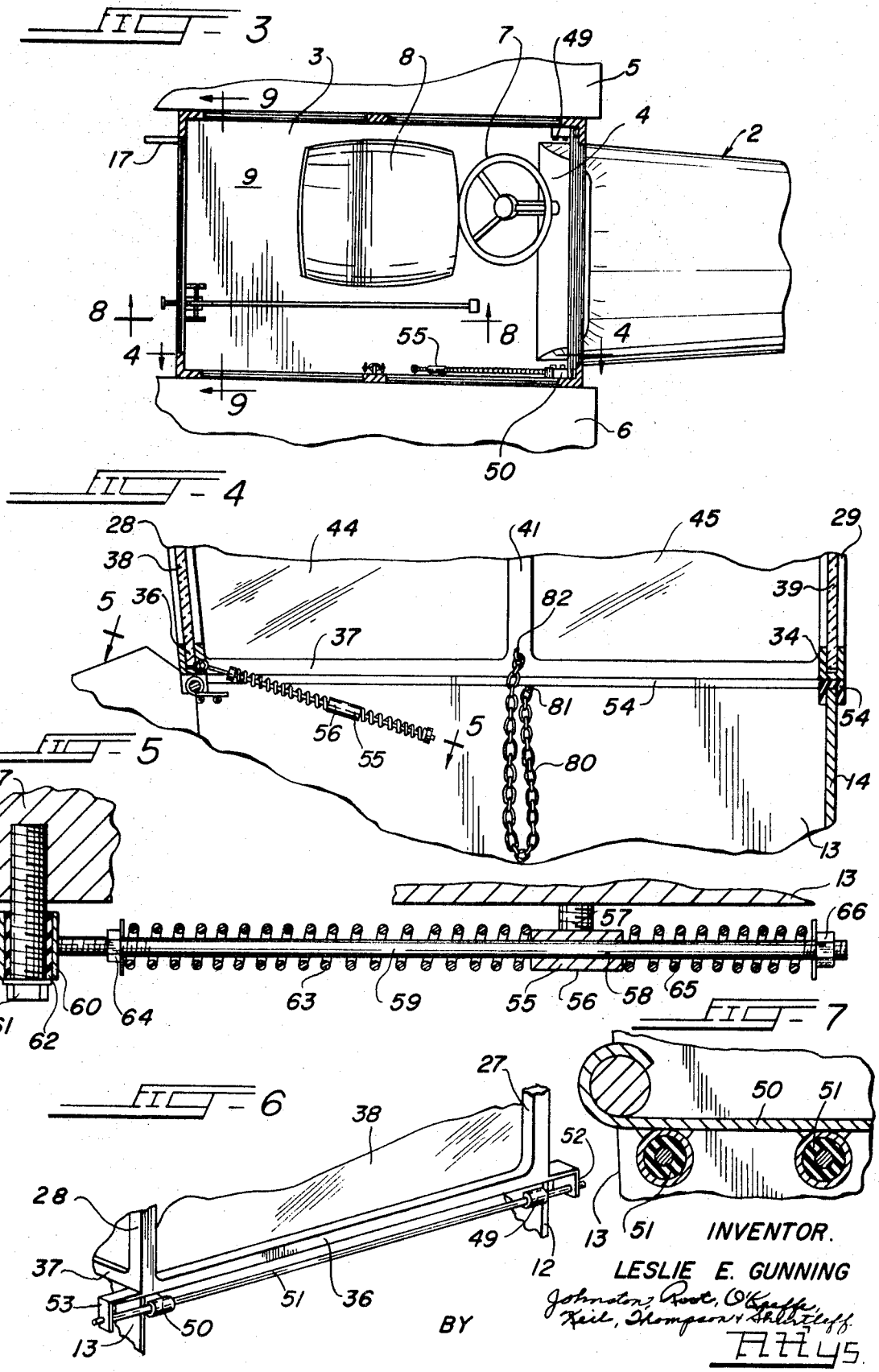

CABS FOR VEHICLES

BACKGROUND OF THE INVENTION

This invention relates to cabs for vehicles, and, more particularly, to cabs which are particularly well adapted for use on tractors, and the like.

It is a primary object of the present invention to afford a novel cab for tractors, and the like.

Cabs for tractors, and the like, have been heretofore known in the art. However, such cabs heretofore known have commonly had several inherent disadvantages, such as, for example, not affording adequate protection to the driver of the tractor against dust and the elements; being too confining to the driver; being difficult to enter and leave; not affording various degrees of ventilation; accentuating noises normally besetting the driver of a tractor during the operation thereof; not affording protection against the elements from all sides; being large and cumbersome in size, or, on the other hand, being too small in size; being complicated in construction and operation; being difficult to install or remove; or being difficult and expensive to manufacture, and the like. It is an important object of the present invention to overcome such disadvantages.

A common difficulty with cabs heretofore known in the art for use on tractors, and the like, has been that they were so constituted and arranged that the noise level within the cab during operation of the tractor was distressingly high and, in many instances, was actually increased over the noise level during operation of the same tractor without a cab. It is an important object of the present invention to overcome this difficulty.

Another object is to afford a novel cab which, when used on a tractor, will reduce the level of noise besetting the driver of the tractor from the normal operation thereof, as compared to the same operation of the tractor without the cab.

Another object is to afford a novel cab for a tractor which, in operative position thereon, is effectively and efficiently sound insulated from the remainder of the tractor.

Yet another object of the present invention is to afford a novel cab for a tractor, and the like, which affords the driver of the tractor effective protection from the elements from all sides.

A further object is to afford a novel cab for a tractor, and the like, which is so constituted and arranged as to enable the driver to readily enter the driver's compartment of the tractor, and to readily exit therefrom.

Another object of the present invention is to afford a novel cab for a tractor which is tiltable, in a novel and expeditious manner, into various positions of use.

Another object is to afford a novel cab for a tractor which may be held, in a novel and expeditious manner, in various tilted positions relative to the tractor, as selected by the driver.

Yet another object is to afford a novel cab for a tractor, and the like, which may be mounted on the tractor in a novel and expeditious manner.

A further object is to afford a novel cab for a tractor, and the like, in which the driver may operate the tractor in either a standing position or a normal sitting position therein.

Another object is to afford a novel cab for a tractor, and the like, which is practical and efficient in operation and which may be readily and economically produced commercially.

Other and further objects of the present invention will be apparent from the following description and claims and are illustrated in the accompanying drawings, which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a rear perspective view of a cab embodying the principles of the present invention, showing the cab mounted in operative position on a tractor;

FIG. 2 is a rear perspective view of the cab shown in FIG. 1, showing the cab disposed in a different operative position;

FIG. 3 is a sectional view taken substantially along the line 3-3 in FIG. 1;

FIG. 4 is a fragmentary detail sectional view taken substantially along the line 4-4 in FIG. 1;

FIG. 5 is an enlarged, fragmentary detail sectional view taken substantially along the line 5-5 in FIG. 4;

FIG. 6 is an enlarged, fragmentary front elevational view of a portion of the cab shown in FIG. 4;

FIG. 7 is an enlarged, fragmentary, longitudinal sectional view of a portion of the cab shown in FIG. 4;

FIG. 8 is a fragmentary, detail sectional view taken substantially along the line 8-8 in FIG. 3; and FIG. 9 is a fragmentary, detail sectional view taken substantially along the line 9-9 in FIG. 3.

DESCRIPTION OF THE EMBODIMENT SHOWN HEREIN

A cab assembly 1, embodying the principles of the present invention, is shown in the accompanying drawings mounted on a tractor 2 to illustrate the presently preferred embodiment of the present invention.

The tractor 2 is of a type well known in the art and readily available on the market, and includes a driver's compartment 3 disposed rearwardly of a dashboard 4 between two fenders 5 and 6, the driver's compartment 3 being open at the top and at the rear thereof. A steering wheel 7, for steering the tractor, extends rearwardly from the dashboard 7 toward a driver's seat 8, which is mounted in the compartment 3 on a floor 9 of the compartment. As will be appreciated by those skilled in the art, this construction is common, and is all old and well known in the art.

The cab assembly 1 embodies, in general, a cab 10 pivotally mounted on a base 11 mounted in the compartment 3, FIGS. 1 and 2.

The base 11 includes three sidewall members 12, 13 and 14, FIG. 2. The sidewall members 12 and 13 are disposed at the left and right sides of the compartment 3, as viewed in FIG. 2, in juxtaposition to the inner faces of the fenders 5 and 6, respectively. Preferably, the sidewall members 12 and 13 are disposed in upright, substantially parallel relation to each other, and extend the entire length of the compartment 3. They may be made of any suitable material such as, for example sheet steel, and are secured to the fenders 5 and 6, respectively, by many suitable means such as, for example, welding. The other sidewall member 14 extends between the sidewalls 12 and 13 and affords a rear wall for the compartment 3. The rear wall 14 includes a door 15 hingedly mounted on hinges 16 for swinging movement between a closed position as shown in FIG. 1 and an open position as shown in FIG. 2. A manually operable latch 17 is mounted on the door 15, and is engageable with a latch member 18 mounted on the sidewall member 12, when the door 15 is disposed in closed position, for releasably holding the door in such closed position.

The cab 10 includes a top panel or roof 19, a front panel or windshield 20, a rear panel or rear window 21, and two side panels or side windows 22 and 23, FIGS. 1 and 2. Preferably, the cab 10 is substantially rectangular in transverse cross section, with the front panel 20 and the rear panel 21 disposed in upright, parallel spaced relation to each other, and with the side panels 22 and 23 extending between the panels 20 and 21 in upright, substantially parallel relation to each other.

The cab 10 includes a frame 25 which may be made of any suitable material such as, for example, aluminum or steel. The frame 25 includes four upright corner posts 26, 27, 28 and 29 disposed at each respective corner thereof, and four upper side rails 30, 31, 32 and 33, FIG. 2. In addition, the frame 25 includes four lower side rails 34, 35, 36 and 37, FIGS. 2 and 6. The upper side rails 30 and 33 extend along the rear and right side of the cab 10, as viewed in FIG. 2, from the corner post 29 to the corner posts 26 and 28, respectively; and the upper side rails 32 and 31 extend from the corner post 27 along the front and left sides of the cab 10, as viewed in FIG. 2, to the corner posts 28 and 26, respectively. Similarly, the lower side rails 34 and 37 extend from the corner post 29 along the rear and right sides of the cab 10, as viewed in FIG. 2, to the corner posts 26 and 28, respectively; and the lower side rails 36 and 35 extend from the corner post 27 along the front and left sides of the cab 10, as viewed in FIG. 2, to the corner posts 28 and 26, respectively.

Preferably, the front panel 20 embodies a single window pane 38 made of a single sheet of suitable transparent material, such as, for example, glass or a suitable plastic, mounted on the corner posts 27 and 28 and the side rails 32 and 36 to afford an unobstructed windshield for the tractor 2; and the rear panel 21 also embodies a single pane 39 made of a single sheet of suitable transparent material, such as, for example, the aforementioned glass or a suitable plastic, mounted on the corner posts 26 and 29 and the side rails 30 and 34 so as to afford an unobstructed rear window for the cab 10.

If desired, the side panels 22 and 23 of the cab 10 can be constructed with each of them embodying a single pane of transparent material, to afford an unobstructed view therethrough, like the front and rear panels 20 and 21. However, for reasons of structural strength, I prefer to construct the panels 22 and 23 with intermediate rails or braces 40 and 41 extending between the rails 31 and 35 and the rails 33 and 37, respectively, midway between the front and rear of the cab 10, FIG. 2. With this preferred construction, two of the aforementioned transparent panes 42 and 43 are embodied in the panel 22, with the pane 42 being mounted on the intermediate brace 40, the front corner post 27, and the front end portions of the side rails 31 and 35, with the pane 43 being mounted on the intermediate brace 40, the rear corner post 26, and the rear end portions of the side rails 31 and 35. Similarly, the panel 23 embodies two panes 44 and 45 of the aforementioned transparent material, with the pane 44 being mounted on the intermediate brace 41, the front corner post 28 and the front end portions of the side rails 33 and 37, and with the pane 45 being mounted on the intermediate brace 41, the rear corner post 29 and the rear end portions of the side rails 33 and 37.

The top wall 19 of the cab 10 is also preferably completely closed and the central body portion thereof may be formed of opaque material such as, for example, wood or sheet metal, or it may be made of translucent material, such as, for example, translucent glass, or the like. However, I prefer to construct the top panel 19 in the same manner as the side panels 22 and 23, namely, with an intermediate brace 46 extending between the side rails 31 and 33 in parallel relation to the side rails 30 and 32 and with two panes 47 and 48 of the aforementioned transparent material being mounted at the front and rear end portions of the top panel 19, respectively, to afford a completely closed top for the cab 10, with clear visibility therethrough.

Two hinge brackets 49 and 50, FIGS. 3 and 7, are mounted by rubber bushings 51 on the sidewalls 12 and 13, respectively, in inwardly projecting relation thereto. A hinge rod 51 extends between, and is mounted on two supporting brackets 52 and 53 which project laterally outwardly from the corner posts 27 and 28, respectively, FIG. 6. The rod 51 is rotatably mounted in the hinge brackets 49 and 50, which are so disposed on the sidewalls 12 and 13 that the longitudinal centerline of the hinge rod 51 is supported forwardly of the front edges of the sidewalls 12 and 13, so that the cab 10 is freely pivotable on the hinge brackets 49 and 50 relative to the sidewall members 12—13 between the lowered position shown in FIG. 1 and a raised position such as that shown in FIG. 2.

The cab 10 and the base 11 are of such size and configuration that, when the cab 10 is disposed in lowered position, as shown in FIG. 1, with the door 15 of the base 11 closed, the side rails 35, 37 and 34 of the cab 10 rest on top of the sidewalls 12, 13 and 14, respectively, of the base 10. Pads 54, preferably in the form of elongated, channel-shaped members made of suitable resilient material such as, for example, rubber, are mounted on the upper edges of the sidewall members 12—14 and preferably extend the entire length thereof, the pad 54 on the rear wall 14 of the base 11 being in two pieces, with one of the pieces mounted on the door 15 and the other piece mounted on the other portion of the rear wall 14. Thus, when the cab 10 is disposed in lowered position on the base 11, it is supported thereby out of metal-to-metal contact with the base 11, the pads 54 and the bushings 51 supporting the cab 10 in sound-insulated relation to the base 11 and, therefore, to the tractor 2.

A slide 55, FIGS. 3, 4 and 5, is mounted on the sidewall 13 of the base 11 in inwardly projecting relation thereto. The slide 55 is substantially T-shaped, having an elongated head 56 from which extends a threaded stud 57. The stud 57 is threaded into the sidewall member 13 and affords a rotatable mounting for the head 58. The head 58 has an opening 59 extending longitudinally therethrough, and a substantially straight, elongated rod 59 is slidably mounted in the opening 58.

A bearing 60 is threaded onto one end of the rod 59, and is rotatably secured to the front end of the lower side rail 37 of the cab 10 by a bolt 61. A rubber bushing 62 is disposed between the bearing 60 and the rod 61 so as to afford a sound-insulated connection between the side rail 37 and the sidewall member 13 through the bolt 61, the bearing 60, the rod 59 and the slide 55.

A compression coil spring 63 is mounted on the rod 59 between the slide 55 and a nut 64 threaded onto the end of the rod 59 which is connected to the bearing 60, FIG. 5. The spring 63 urges the rod 59 to slide forwardly, or to the left, as viewed in FIGS. 4 and 5, through the slide 55, and the force of the spring 63 may be adjusted by rotating the nut 64.

Another compression coil spring 65 is mounted on the other end of the rod 59 between the slide 55 and a nut 66 threaded onto the end of the rod 59 remote from the bearing 60. This spring 65 urges the rod 59 rearwardly, or to the right, as viewed in FIGS. 4 and 5, and the force thereof may be readily adjusted by turning the nut 66.

Thus, it will be seen that the spring 65 is effective to urge the rod 59 forwardly through the slide 55 to thereby urge the cab to pivot on the hinge brackets 49 and 50 toward raised position. On the other hand, the spring 65 is effective to urge the rod 59 to slide through the slide 55 in a direction effective to move the cab 10 toward lowered position. However, in the preferred form of cab assembly 1 shown in the drawings, the force of the spring 63 is greater than the force of the spring 65 in all position of the rod 59, and, preferably, is of sufficient magnitude that it would be effective to move the cab 10 to fully raised position, if the cab 10 were not otherwise restrained. With the rod 59, the spring 63 and the spring 65 constituted and arranged in this manner, the cab 10 is supported in all raised positions by a shock-absorbing type of support which yieldingly resists abrupt movement of the cab 10 toward raised position and toward lowered position.

An L-shaped latch 67 for the cab 10 is pivotally mounted on the bracket 68 which projects forwardly from the rear wall 14 of the base 11, FIG. 8. The latch 67 has a substantially vertically disposed arm 69 and a substantially horizontally disposed arm 70, the arm 70 projecting forwardly from the lower end portion of the arm 69. The arm 69 is pivotally mounted, intermediate its length, on the bracket 68 by a suitable means such as a pin 71, and has a hook 72 at the upper end thereof.

A catch 73 is mounted on the lower side rail 34 of the rear wall 21 of the cab 10 in position to be operatively engaged by the hook 72 on the latch 67, when the cab 10 is disposed in fully lowered position, to thereby releasably hold the latter in such lowered position. The catch 73 is in the form of a roller, and preferably is constructed of a suitable sound-insulating material such as, for example, rubber, so that the connection afforded between the base 11 and the cab 10 by the latch 67 is such as to deter the transmission of sound thereby from the tractor 2 through the base 11 to the cab 10.

A compression coil spring 74 is mounted on the rear wall 14 of the base 11 in position to yieldingly urge the latch 67 to rotate on the bracket 68 in a counterclockwise direction as viewed in FIG. 8, to thereby yieldingly urge the hook 72 into position to operatively engage the catch 73. A plunger 75 extends through the rear wall 14 and is slidable mounted in a rubber bushing 76 mounted in the rear wall 14. The plunger 75 is connected at its inner end by a pin 77 to the arm 69 of the latch 67, and at its outer end has a handle 78 thereon by which the plunger 75 may be manually moved inwardly and outwardly from outside the cab 10 to thereby move the latch 67 into disengaging and engaging position, respectively, relative to the catch 73.

The arm 70 of the latch 67 extends forwardly from the arm 69 in upwardly spaced, closely adjacent relation to the floor 9 of the driver's compartment 3 and terminates at its front end in a foot pedal 79. The foot pedal 79 is preferably disposed forwardly of the seat 8 in the driver's compartment 3 in such position that it may be readily pressed downwardly by the driver, when he is sitting on the seat 8, to thereby release the latch 67 from its operative engagement with the catch 73 and free the cab 10 for upward rotation from its fully closed position.

A holddown device in the from of a chain 80, FIGS. 2 and 4, has one end secured to the upper edge portion of the sidewall 13 by a bolt 81. A hook 82 is mounted on the lower side rail 37 of the side panel 23 of the cab 10 in such position that links of the chain 80, as selected by the operator, can be hooked thereover to thereby hold the cab 10 in any selected partially raised position against the urging of the spring 63 on the rod 59. If desired, another chain 83 may be similarly disposed at the other side of the cab 10, as shown in FIG. 2.

With the cab assembly 1 constructed in the manner disclosed herein, it will be seen that it may be quickly and easily installed on a tractor. To accomplish this, it is merely necessary to secure the sidewall members 12 and 13 to the body of the tractor 2 in operative position, such as by welding them to the fenders 5 and 6 of the tractor 2. The rear wall 14 may then be secured in position, such as by welding it to the rear edge of the sidewall member 13. The mounting brackets 49 and 50 on the rod 51, which is mounted in the brackets 52 and 53 on the cab 10, may then be secured to the sidewall members 12 and 13, respectively, to thereby mount the cab 10 in operative position on the base 11. Preferably, the rod 59 and slide 55 assembly, including the springs 63 and 65 and the bearing 60, the chains 80 and 83 and the latch 67 are preassembled on the base 11, prior to the latter being mounted on the tractor 2, so that with the cab 10 and base 11 mounted in operative position on the tractor 2, all that is necessary to complete the installation of the cab assembly 1 is to connect the bearing 60 and the chains 80 and 83 to the cab 10.

In the operation of the cab assembly 1, the tractor 2 may be stored with the cab 1 disposed in fully closed position, as shown in FIG. 1, wherein the latch 67 is operatively engaged with the catch 73 to thereby hold the cab 1 in fully lowered position. When it is desired to enter the driver's compartment 3, the operator can press on the plunger 75 to thereby move the plunger 75 inwardly and release the latch 67, so that the cab 10 is freed for upward movement on the hinge brackets 49 and 50 into raised position, the spring 63 aiding in this movement. With the cab 10 thus disposed in raised position, the operator, if he so desires, can climb over the rear wall 14 into the driver's compartment. However, preferably, the operator will open the door 15 by means of the handle 17 so that he may enter the driver's compartment 3 through the doorway which is normally closed by the door 15.

After the driver has entered the compartment 3, he may close the door 15, and lower the cab 10 to any desired position. In fully lowered position the cab 10 may be releasably secured in this position by the latch 67, and in any partially lowered position the cab 10 may be releasably secured in that position by means of the chains 80 and 83.

The cab 10 is preferably of such height and length that with the driver sitting in normal position on the seat 8, substantial clearance is afforded between the top of the driver's head and the top wall 19 of the fully closed cab 10; and when the cab 10 is disposed in fully raised position, sufficient head room is afforded in the rear end portion thereof that the driver 10 can stand upright in the compartment 3 in position to operate and steer the tractor 2.

From the foregoing it will be seen that the present invention affords a novel cab assembly which may be quickly and easily mounted on existing tractors.

Also, it will be seen that the present invention affords a novel cab assembly wherein the cab thereof, when mounted in operative position on such a tractor, is connected to the tractor in a sound-insulated manner effective to close out much of the operating noise of the tractor.

In addition, it will be seen that the present invention affords a novel cab for a tractor which may be quickly and easily raised and lowered to selected position, and into which, and from which, the operator may readily move.

Also, it will be seen that the present invention affords a novel cab construction wherein the ventilation may be readily adjusted by the operator.

In addition, it will be seen that the present invention affords a practical and efficient cab for tractors, and one which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. In a vehicle having a body and having a driver's compartment open at the top,
   a. sidewall members mounted in substantially upstanding position on said body,
   b. a cab disposed over said driver's compartment and having a front and a rear,
   c. said cab comprising
      1. a top, and
      2. transparent panels extending downwardly from said top, and
   d. means pivotally mounting said cab on said sidewall members for rotation between a raised position and a lowered position thereon,
   e. said sidewall members including a door hingedly mounted at the rear of said driver's compartment and movable between
      1. a closed position wherein said door underlies the bottom of the rear of said cab and
      2. an open position wherein said door projects rearwardly from said cab in position to define one side of a doorway affording access to the interior of said driver's compartment and cab from the rear of said vehicle.

2. The combination defined in claim 1, and which includes
   a. resilient means mounted on said cab and one of said sidewall members for yieldingly urging said cab toward said raised position.

3. In a vehicle having a body and having a driver's compartment open at the top,
   a. sidewall members mounted in substantially upstanding position on said body,
   b. a cab disposed over said driver's compartment,
   c. said cab comprising
      1. a top, and
      2. transparent panels extending downwardly from said top, and d. means pivotally mounting said cab on said sidewall members for rotation between a raised position and a lowered position thereon,
e. said means comprising
  1. hinge members,
  2. resilient bushing means mounted on said sidewall members and operatively connected to said hinge members for mounting said hinge members on said sidewall members in spaced sound-insulated relation thereto, and
  3. means mounted on and carried by said panels and operatively engaged with said hinge members for rotation relative thereto to thereby rotatably mount said cab for rotation relative to said hinge members.
4. The combination defined in claim 3, and
a. which includes
  1. resilient pads mounted on the upper edge portions of said sidewall members, and
b. in which the lower edges of said panels rest on top of said pads when said cab is disposed in said lowered position to thereby support said cab on said sidewall member in sound-insulated relation thereto.
5. In a vehicle having a body and having a driver's compartment open at the top,
a. sidewall members mounted in substantially upstanding position on said body,
b. a cab disposed over said driver's compartment,
c. said cab comprising
  1. a top, and
  2. transparent panels extending downwardly from said top, and
d. means pivotally mounting said cab on said sidewall members for rotation between a raised position and a lowered position thereon,
e. a supporting member mounted on one of said sidewall members,
f. a rod slidably mounted in said supporting member and operatively connected to said cab for moving said cab toward said open position when said rod is moved in one direction relative to said supporting member, and
g. resilient means mounted in operative position between said rod and said supporting member for urging said rod to move in said one direction relative to said supporting member.
6. The combination defined in claim 5, and which includes
a. other resilient means mounted in operative position between said rod and said supporting means for urging said rod to move in the direction opposite to said one direction relative to said supporting member.
7. The combination defined in claim 6, and in which
a. the force of said other resilient means urging said rod to move is less than the force of said first-mentioned resilient means urging said rod to move, and
b. said force of said other resilient means increases as said cab moved from said lowered position toward said raised position thereof.
8. In a tractor having a body, and a driver's compartment having a front side and a rear side,
a. wall members mounted in upstanding position on opposite sides of said compartment and extending between said front and rear sides,
b. another wall member mounted in upstanding position and extending between said first mentioned wall members at said rear side
c. a cab comprising
  1. a top,
  2. a transparent front panel,
  3. a transparent rear panel, and
  4. two oppositely disposed side panels extending between said front and rear panels,
d. means pivotally mounting said cab on said sidewall members at the front portion of said compartment for vertical swinging movement between
  1. a lowered position in which
    a'. said front panel projects upwardly from said front side,
    b'. said side panels rest on top of respective ones of said first-mentioned wall members, and
    c'. said rear panel rests on top of said other wall member, and
  2. a raised position in which
    a'. said front panel projects forwardly from said front side, and
    b'. said side panels and said rear panels are disposed in upwardly spaced relation to said first-mentioned wall members and said other wall member, respectively, to thereby afford access to the interior of said compartment from the rear, and
e. means pivotally connected to said cab and one of said wall members for continuously urging said cab toward said raised position.
9. The combination defined in claim 8, and which includes
a. means operatively connected to said cab for holding said cab in any one of a plurality of selected positions between said raised and lowered positions.
10. In a tractor having a body, and a driver's compartment having a front side and a rear side,
a. wall members mounted in upstanding position on opposite sides of said compartment and extending between said front and rear sides,
b. another wall member mounted in upstanding position and extending between said first-mentioned wall members at said rear side
c. a cab comprising
  1. a top,
  2. a transparent front panel,
  3. a transparent rear panel, and
  4. two oppositely disposed side panels extending between said front and rear panels,
d. means pivotally mounting said cab on said sidewall members at the front portion of said compartment for vertical swinging movement between
  1. a lowered position in which
    a'. said front panel projects upwardly from said front side,
    b'. said side panels rest on top of respective ones of said first-mentioned wall members, and
    c'. said rear panel rests on top of said other wall member, and
  2. a raised position in which
    a'. said front panel projects forwardly from said front side, and
    b'. said side panels and said rear panel are disposed in upwardly spaced relation to said first-mentioned wall members and said other wall member, respectively, to thereby afford access to the interior of said compartment from the rear, and
e. latch means mounted on said other wall member and manually operable from within and without said compartment for releasably latching said cab in said lowered position,
f. said latch means comprising
  1. a latch member mounted on said cab, and
  2. another latch member mounted on said other wall member and movable into and out of latching engagement with said first-mentioned latch member, and
g. the surface of one of said latch members engaging the other of said latch members comprising resilient pad material whereby when said latch members are disposed in said latching engagement with each other they are in sound-insulated relation to each other.